(12) United States Patent
Ren et al.

(10) Patent No.: US 12,381,016 B2
(45) Date of Patent: Aug. 5, 2025

(54) LIQUID METAL MICROCAPSULE, CONDUCTIVE PASTE AND PREPARATION METHOD THEREOF, AND ELECTRONIC DEVICE

(71) Applicant: Beijing Dream Ink Technologies Co., Ltd., Beijing (CN)

(72) Inventors: Zhongwei Ren, Beijing (CN); Zhenlong Men, Beijing (CN)

(73) Assignee: Beijing Dream Ink Technologies Co., Ltd., Beijing (CN)

( * ) Notice: Subject to any disclaimer, the term of this patent is extended or adjusted under 35 U.S.C. 154(b) by 369 days.

(21) Appl. No.: 17/790,470

(22) PCT Filed: Nov. 23, 2021

(86) PCT No.: PCT/CN2021/132359
§ 371 (c)(1),
(2) Date: Jun. 30, 2022

(87) PCT Pub. No.: WO2022/217920
PCT Pub. Date: Oct. 20, 2022

(65) Prior Publication Data
US 2023/0317311 A1     Oct. 5, 2023

(30) Foreign Application Priority Data
Apr. 16, 2021   (CN) .......................... 202110412659.8

(51) Int. Cl.
*H01B 1/22*       (2006.01)
*B32B 15/08*      (2006.01)
*B32B 27/28*      (2006.01)

(52) U.S. Cl.
CPC ............... *H01B 1/22* (2013.01); *B32B 15/08* (2013.01); *B32B 27/28* (2013.01); *B32B 27/283* (2013.01);
(Continued)

(58) Field of Classification Search
None
See application file for complete search history.

(56) References Cited

U.S. PATENT DOCUMENTS

| | | | |
|---|---|---|---|
| 10,784,011 B1 * | 9/2020 | Cumby ................ | H01B 7/0027 |
| 2014/0299231 A1 * | 10/2014 | Chu .................... | B23K 35/0222 148/23 |

(Continued)

FOREIGN PATENT DOCUMENTS

| | | | |
|---|---|---|---|
| CN | 103507329 A | * | 1/2014 |
| CN | 105108162 A | | 12/2015 |

(Continued)

OTHER PUBLICATIONS

Chinese Notice of Allowance mailed Nov. 7, 2022 issued in CN Application No. 202110412659.8.

(Continued)

*Primary Examiner* — Aaron Austin
*Assistant Examiner* — Thomas J Kessler
(74) *Attorney, Agent, or Firm* — Weaver Austin Villeneuve & Sampson LLP

(57) ABSTRACT

The present application provides a liquid metal microcapsule, a conductive paste and preparation methods thereof, and an electronic device, and relates to the technical field of new materials. The present application provides a liquid metal microcapsule, including: a liquid metal core, a cohesive layer coating the liquid metal core, and a coating layer coating the cohesive layer. Binding force between the cohesive layer and liquid metal is greater than that between the coating layer and the liquid metal, and binding force between the cohesive layer and the coating layer is greater than that between the coating layer and the liquid metal.

(Continued)

According to the technical solution of the present application, stability of the conductive paste containing liquid metal can be improved.

10 Claims, 3 Drawing Sheets

(52) U.S. Cl.
CPC ....... *B32B 2250/03* (2013.01); *B32B 2255/10* (2013.01); *B32B 2255/26* (2013.01); *B32B 2307/202* (2013.01); *B32B 2311/00* (2013.01); *B32B 2379/08* (2013.01); *B32B 2383/00* (2013.01)

(56) References Cited

U.S. PATENT DOCUMENTS

2015/0232709 A1* 8/2015 Matsui ................. C09J 9/02
                                                         252/514
2017/0062374 A1* 3/2017 Chu ................. H01L 24/09

FOREIGN PATENT DOCUMENTS

| CN | 107938369 | A | * | 4/2018 | ............... D06N 3/00 |
| CN | 107962180 | A | | 4/2018 | |
| CN | 109570515 | A | | 4/2019 | |
| CN | 110729071 | A | | 1/2020 | |
| CN | 111128440 | A | * | 5/2020 | ............... H01B 1/22 |
| CN | 111205409 | A | | 5/2020 | |
| JP | 2002008442 | A | | 1/2002 | |
| KR | 20180118030 | A | | 10/2018 | |

OTHER PUBLICATIONS

CN ISR dated (unknown) issued in CN Application No. PCT/CN2021/132359 [English translation not available].
CN Written Opinion dated Mar. 1, 2022 in PCT Application No. PCT/CN2021/132359 (with English Translation).

* cited by examiner

LIQUID METAL MICROCAPSULE, CONDUCTIVE PASTE AND PREPARATION METHOD THEREOF, AND ELECTRONIC DEVICE

The present application is a National Stage Application, filed under 35 U.S.C. 371, of International Patent Application No. PCT/CN2021/132359, filed on Nov. 23, 2021, which claims priority to Chinese patent application No. 202110412659.8, filed on Apr. 16, 2021, the contents of both of which are incorporated herein by reference in their entirety.

TECHNICAL FIELD

The present application relates to the technical field of new materials, and in particular, to a liquid metal microcapsule, a conductive paste and preparation methods thereof, and an electronic device.

BACKGROUND

In recent years, with the rapid development of electronic information technologies, the market is increasingly demanding for specificity and functionality of conductive materials. In order to meet the above requirements, the conductive materials have gradually developed from single materials such as metal and carbon to composite conductive materials. The composite conductive materials are mostly made of solid conductive media and carrier materials. For example, conductive particles such as silver powder, copper powder, carbon powder, and graphene are combined with epoxy resin, acrylic resin, polyurethane resin, vinyl chloride-vinyl acetate copolymer resin, and organic silicon resin.

Liquid metal has excellent conductivity and flexibility. Addition of the liquid metal to a conductive paste can improve the flexibility of the conductive paste. In the related art, some solutions of adding the liquid metal into the conductive paste are proposed. For example, a resin system is directly filled with the liquid metal and various conductive powder to produce solidifiable composite conductive materials. However, the inventor finds that the addition of the liquid metal may seriously reduce the stability of the composite conductive material (during preparation, storage or use), resulting in agglomeration, flocculation, and settlement of the conductive powder in the composite conductive material, a significant decrease in fineness, uneven distribution of the conductive material, and a significant increase in resistance or even no conductivity at all.

SUMMARY

The present application provides a liquid metal microcapsule, a conductive paste and preparation methods thereof, and an electronic device, which can improve stability of the conductive paste containing liquid metal.

In a first aspect, the present application provides a liquid metal microcapsule, and adopts the following technical solution.

The liquid metal microcapsule includes: a liquid metal core, a cohesive layer coating the liquid metal core, and a coating layer coating the cohesive layer; binding force between the cohesive layer and liquid metal being greater than that between the coating layer and the liquid metal, and binding force between the cohesive layer and the coating layer being greater than that between the coating layer and the liquid metal.

Optionally, a substance for promoting dispersion of the liquid metal is selected as a cohesive material for making the cohesive layer.

Optionally, the cohesive material is a copolymer of a low molecular weight unsaturated polyacid polymer with polysiloxane, or a copolymer of a low molecular weight unsaturated polyacid polymer with polyamine, or a copolymer of a low molecular weight unsaturated polyacid polymer with alcohol amines, or a high molecular weight block polymer containing pigment affinity groups.

Optionally, the coating layer is made of one of vinyl chloride-vinyl acetate copolymer resin, polyurethane resin, epoxy resin, and polyester resin.

Optionally, the liquid metal microcapsule has a diameter ranging from 0.01 m to m.

Further, the cohesive layer has a thickness ranging from 5 nm to 30 nm, and the coating layer has a thickness ranging from 20 nm to 200 nm.

In a second aspect, the present application provides a liquid metal microcapsule preparation method, for preparing the liquid metal microcapsule according to any one of the foregoing, and adopts the following technical solution.

The liquid metal microcapsule preparation method includes:
- step S11, placing liquid metal and a cohesive material in an airtight container;
- step S12, filling the container with a protective gas or vacuuming the container;
- step S13, fully dispersing the liquid metal and the cohesive material to form a liquid metal core coated with a cohesive layer;
- step S14, dissolving a coating material to form a coating solution; and
- step S15, adding the material obtained in step S14 to the material obtained in step S13, and mixing the materials to obtain the liquid metal microcapsule, the liquid metal microcapsule including: a liquid metal core, a cohesive layer coating the liquid metal core, and a coating layer coating the cohesive layer.

Optionally, a mass ratio of the liquid metal to the cohesive material is ranging from 1:20 to 1:2.

Optionally, a mass ratio of the coating solution to the liquid metal is ranging from 1:10 to 1:2.

In a third aspect, the present application provides a conductive paste, and adopts the following technical solution.

The conductive paste includes: conductive powder, a film-forming substance, a solvent, an auxiliary agent, and the liquid metal microcapsule according to any one of the foregoing.

Optionally, the conductive paste includes: 45 wt % to 80 wt % of the conductive powder; 1 wt % to 10 wt % of the film-forming substance; 0.01 wt % to 50 wt % of the liquid metal microcapsule; 0.1 wt % to 2 wt % of the auxiliary agent; and 2 wt % to 20 wt % of the solvent.

In a fourth aspect, the present application provides a conductive paste preparation method, for preparing the conductive paste according to any one of the foregoing, and adopts the following technical solution.

The conductive paste preparation method includes:
- step S21, preparing the liquid metal microcapsule;
- step S22, dissolving the film-forming substance by using the solvent;
- step S23, adding the auxiliary agent to the material obtained in step S22;
- step S24, adding the conductive powder to the material obtained in step S23; and step S25, mixing the material obtained in step S24 with the material obtained in step S21, to obtain the conductive paste.

In a fifth aspect, the present application provides an electronic device, including a substrate and a conducting circuit located on the substrate, wherein the conducting circuit is formed by printing and curing of the conductive paste according to any one of the foregoing.

The present application provides a liquid metal microcapsule, a conductive paste and preparation methods thereof, and an electronic device. The liquid metal microcapsule includes: a liquid metal core, a cohesive layer coating the liquid metal core, and a coating layer coating the cohesive layer; binding force between the cohesive layer and liquid metal being greater than that between the coating layer and the liquid metal, and binding force between the cohesive layer and the coating layer being greater than that between the coating layer and the liquid metal. In the liquid metal microcapsule, the liquid metal core is coated by the cohesive layer and the coating layer, and during the preparation, storage, and use of the conductive paste, the liquid metal may not contact the conductive powder. Therefore, the interaction in the related art does not exist among the liquid metal, the conductive powder, and the film-forming substance, so as to effectively improve the stability of the conductive paste containing the liquid metal.

BRIEF DESCRIPTION OF DRAWINGS

In order to more clearly illustrate the technical solutions in embodiments of the present application or the related art, the accompanying drawings used in the description of the embodiments or the related art will be briefly introduced below. It is apparent that, the accompanying drawings in the following description are only some embodiments of the present application, and other drawings can be obtained by those of ordinary skill in the art from the provided drawings without creative efforts.

DESCRIPTION OF EMBODIMENTS

In order to make the objectives, technical solutions and advantages of the embodiments of the present application clearer, the technical solutions in the embodiments of the present invention will be described clearly and completely below with reference to the accompanying drawings in the embodiments of the present application. Apparently, the described embodiments are merely some of rather than all of the embodiments of the present application. All other embodiments acquired by those skilled in the art without creative efforts based on the embodiments of the present application shall fall within the protection scope of the present application.

It is to be noted that technical features in the embodiments of the present application may be combined with each other without conflict.

Taking a preparation process as an example, in an existing preparation process of a composite conductive material, one of the following three methods is adopted. In the first method, a resin system is filled with liquid metal and conductive powder at the same time. In the second method, the conductive powder and the liquid metal are sequentially added to the resin system. In the third method, the conductive powder is added to the resin system, and the liquid metal is added to another solvent system, which are then mixed.

After a lot of repeated experiments and analysis on components and a preparation process of the composite conductive material, the inventor has found that the reasons for the above phenomenon are as follows. In the preparation process of the composite conductive material, the liquid metal has an obvious wetting and coating effect on the conductive powder in various "high energy" processing processes (such as stirring, ball milling, sand milling, or three-roller grinding). During high-speed movement, the conductive powder may fuse quickly after mutual collision under the wetting and coating effect of the liquid metal, and/or the liquid metal changes an original spreading state of a wetting dispersant in the solvent and resin in the resin system, causing the resin to change rapidly in morphology and flocculate into units with very small surface areas. As a result, a physical barrier and a stable double electric layer structure cannot be provided for the conductive powder, resulting in agglomeration of the conductive powder. The probability of occurrence of this situation increases significantly with an increase in filling amounts of the liquid metal and the conductive powder. If the filling amounts of the conductive powder and the liquid metal are reduced, the phenomenon can be prevented to some extent, but content of active components of the composite conductive material decreases, and the overall conductive property decreases.

Figure 1:
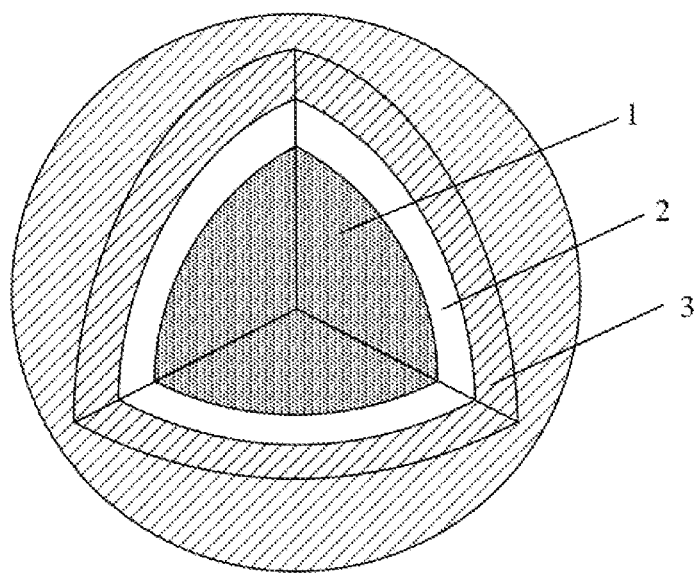
FIG. 1 is a schematic structural diagram of a liquid metal microcapsule according to an embodiment of the present application.

In order to solve the problem during the preparation of the conductive paste from the liquid metal, according to an embodiment of the present application, a liquid metal microcapsule is provided. Specifically, as shown in FIG. 1, FIG. 1 is a schematic structural diagram of a liquid metal microcapsule according to an embodiment of the present application. The liquid metal microcapsule includes: a liquid metal core 1, a cohesive layer 2 coating the liquid metal core 1, and a coating layer 3 coating the cohesive layer 2. Binding force between the cohesive layer 2 and liquid metal is greater than that between the coating layer 3 and the liquid metal, and binding force between the cohesive layer 2 and the coating layer 3 is greater than that between the coating layer 3 and the liquid metal.

The binding force between the cohesive layer 2 and the liquid metal core 1 or the coating layer 3 may be embodied in physical ways, such as adsorption and adhesion, or in chemical ways, such as ionic bonding, covalent bonding, van der Waals bonding or metallic bonding, or a combination of physical and chemical ways. Optionally, in an embodiment of the present application, the binding force is achieved by different groups in the cohesive layer 2 and the coating layer 3. For example, the groups in the cohesion layer 2 have strong polarity, and the groups in the coating layer 3 have moderate polarity, which leads to greater binding force between the cohesion layer 2 and the liquid metal core 1.

In the liquid metal microcapsule, the liquid metal core 1 is coated by the cohesive layer 2 and the coating layer 3, and during the preparation, storage, and use of the conductive paste, the liquid metal may not contact the conductive powder. Therefore, the interaction in the related art does not exist among the liquid metal, the conductive powder, and the film-forming substance, so as to effectively improve the stability of the conductive paste containing the liquid metal. In addition, the arrangement of the cohesive layer 2 may greatly improve a coating effect of the coating layer 3 on the liquid metal core 1 and greatly increase the difficulty of separating the liquid metal core 1 from the coating layer 3, thereby enabling the structure of the liquid metal microcapsule to be more stable and further improving the stability of the conductive paste containing the liquid metal.

Figure 2:
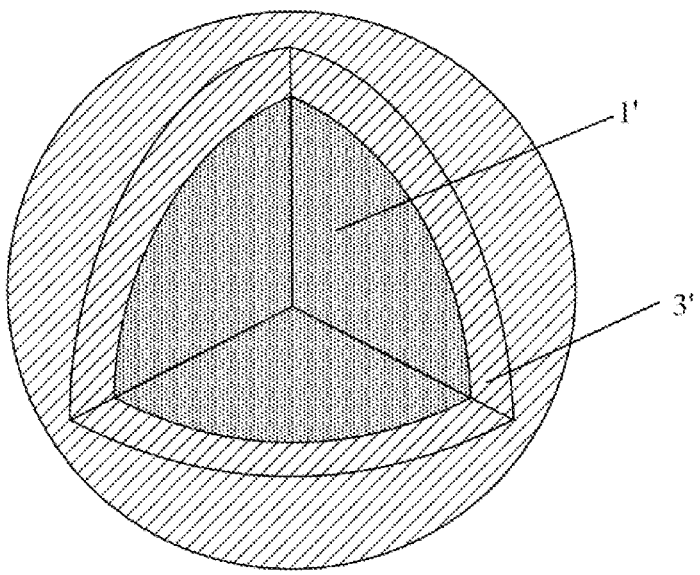
FIG. 2 is a schematic structural diagram of a liquid metal microcapsule in the related art.

During the use of the conducting circuit made of conductive paste containing a liquid metal microcapsule, when the conducting circuit is bent, stretched or twisted in an environment higher than a melting point of the liquid metal, the liquid metal microcapsule may be deformed and broken to release the liquid metal coated therein. The liquid metal is in a state and has good fluidity and deformation capability. A conducting path may be filled with the liquid metal, so that the conducting circuit has good flexibility. Compared with the liquid metal microcapsule formed directly by coating the liquid metal core with the coating layer shown in FIG. 2, in the embodiment of the present application, the coating layer 3 has a good coating effect on the liquid metal core 1, and it is difficult for the liquid metal core 1 to detach from the coating layer 3, so that a filling amount of the liquid metal in the conductive paste can be greatly increased, further improving the flexibility of the conducting circuit.

The structure of each layer of the liquid metal microcapsule is described in detail below in embodiments of the present application.

Optionally, in an embodiment of the present application, the liquid metal is low-melting-point metal with a melting point below 300° C., e.g., a metallic element (mercury, gallium, indium, tin, or the like) with a melting point below 300° C., an alloy with a melting point below 300° C., or a mixture of the two. The alloy with a melting point below 300° C. may be one of an indium gallium alloy, a gallium-indium-tin alloy, a gallium-tin alloy, a gallium-zinc alloy, a gallium-indium-zinc alloy, a gallium-tin-zinc alloy, a gallium-indium-tin-zinc alloy, a gallium-tin-cadmium alloy, a gallium-zinc-cadmium alloy, a bismuth-indium alloy, a bismuth-tin alloy, a bismuth-indium-tin alloy, a bismuth-indium-zinc alloy, a bismuth-tin-zinc alloy, a bismuth-indium-tin-zinc alloy, a bismuth-indium-tin-lead alloy, a bismuth-tin-cadmium alloy, a bismuth-lead-tin alloy, a bismuth-tin-lead-cadmium alloy, a tin-lead alloy, a tin-copper alloy, a tin-zinc alloy, a tin-zinc-copper alloy, and a tin-silver-copper alloy.

Optionally, the melting point of the liquid metal satisfies the following condition. The liquid metal is liquid at least when the conducting circuit made of a conductive paste containing the liquid metal microcapsule deforms. Specifically, the following situations are included. In the first situation, if a normal operating (i.e., without obvious deformation) temperature T1 of the conducting circuit is the same as a temperature T2 at which the deformation occurs, the melting point of the liquid metal should be lower than the temperature T1 or T2, so that the liquid metal is liquid when the conducting circuit deforms. In the second situation, if the normal operating temperature T1 of the conducting circuit is higher than the temperature T2 at which the deformation occurs, the melting point of the liquid metal should be lower than the temperature T2, so that the liquid metal is liquid when the conducting circuit deforms. In the third situation, if the normal operating temperature T1 of the conducting circuit is higher than the temperature T2 at which the deformation occurs, the melting point of the liquid metal should be lower than the temperature T2, so that the liquid metal is liquid when the conducting circuit deforms. In this case, the liquid metal can be either liquid or solid in the normal operation of the conducting circuit. For example, the conducting circuit is an antenna in a washable label, whose normal operating temperature is room temperature. The conducting circuit is required to deform when washed by industrial water or a washer, and a washing temperature is higher than the room temperature. Then, the melting point of the liquid metal is appropriate provided that the liquid metal is liquid during the washing. That is, the melting point of the liquid metal may be lower than the washing temperature and higher than the room temperature, or the melting point of the liquid metal is lower than the room temperature.

Optionally, the liquid metal in the liquid metal microcapsule is a gallium-indium alloy, gallium-tin-alloy, gallium elementary substance, gallium-indium-tin alloy, or gallium-indium-tin-zinc alloy which is liquid at room temperature.

Optionally, on the premise of meeting the above binding force requirement, a substance for promoting dispersion of the liquid metal is selected as the cohesive material for making the cohesive layer in the embodiment of the present application, so that the cohesive material can promote the dispersion of the liquid metal during the making of the liquid metal microcapsule and during the mixing and dispersion of the liquid metal and the cohesive material, and then the liquid metal can be dispersed into smaller droplets.

Optionally, the cohesive material is a copolymer of a low molecular weight unsaturated polyacid polymer with polysiloxane, or a copolymer of a low molecular weight unsaturated polyacid polymer with polyamine, or a copolymer of a low molecular weight unsaturated polyacid polymer with alcohol amines, or a high molecular weight block polymer containing pigment affinity groups. It is to be noted that an appropriate amount of solvent may also be added to the cohesive material according to an actual requirement.

Optionally, the coating layer 3 is made of one or more of polyester resin, melamine resin, chloro-vinegar resin, vinyl chloride-vinyl acetate resin, organic silicon resin, gelatin, sodium alginate, polyvinylpyrrolidone, chitosan, polyurethane resin, acrylic resin, epoxy resin, fluorocarbon resin, epoxy acrylic resin, epoxy acrylate resin, polyester acrylate resin, phenolic resin, nitrocellulose, ethyl cellulose, alkyd resin, amino resin, vinyl chloride-vinyl acetate copolymer resin, hydroxyl-modified vinyl chloride-vinyl acetate copolymer resin, thermoplastic polyurethane resin, styrene butadiene rubber resin, nitrile rubber resin, isocyanate with a blocking group, and oligomers thereof. The selection of the above substance as the coating layer 3 has the following advantages. Firstly, the coating material can exist stably with the liquid metal for a long time, which has a PH close to neutral, has no strong alkaline or acidic component, and has no significant chemical reaction with the liquid metal. Secondly, the coating material has good compatibility with the film-forming substance in the conductive paste, which can ensure that the conductive paste has good fusion and no significant phase separation. Thirdly, the coating material has self-forming properties and may not cause defects in the overall performance of the conductive paste. When the styrene butadiene rubber resin and the nitrile rubber resin are mixed with other materials, the coating effect of the liquid metal microcapsule can be further improved, and then the stability of the conductive paste can be improved.

Optionally, in an embodiment of the present application, in an embodiment of the present application, the liquid metal microcapsule has a diameter ranging from 0.01 μm to 5 μm. On the one hand, the liquid metal microcapsule is easily broken under bending damage, so as to fill a large number of gaps formed between the conductive powder formed due to external deformation and compensate for the rise of resistance caused by the reduction of effective contact of the conductive powder. On the other hand, the proportion of the liquid metal microcapsule is moderate, phase separation is not easy to occur, and it is not easy to lead to the destruction of the liquid metal microcapsule during screen printing, so as to ensure the overall adhesion of the conductive paste and prevent a risk of short circuit in the printing of complex patterns with low line spacing.

Further, in an embodiment of the present application, the cohesive layer 2 has a thickness ranging from 5 nm to 30 nm, and the coating layer 3 has a thickness ranging from 20 nm to 200 nm, so as to improve a coating effect of the liquid metal microcapsule and improve the stability of the conductive paste.

Figure 3:
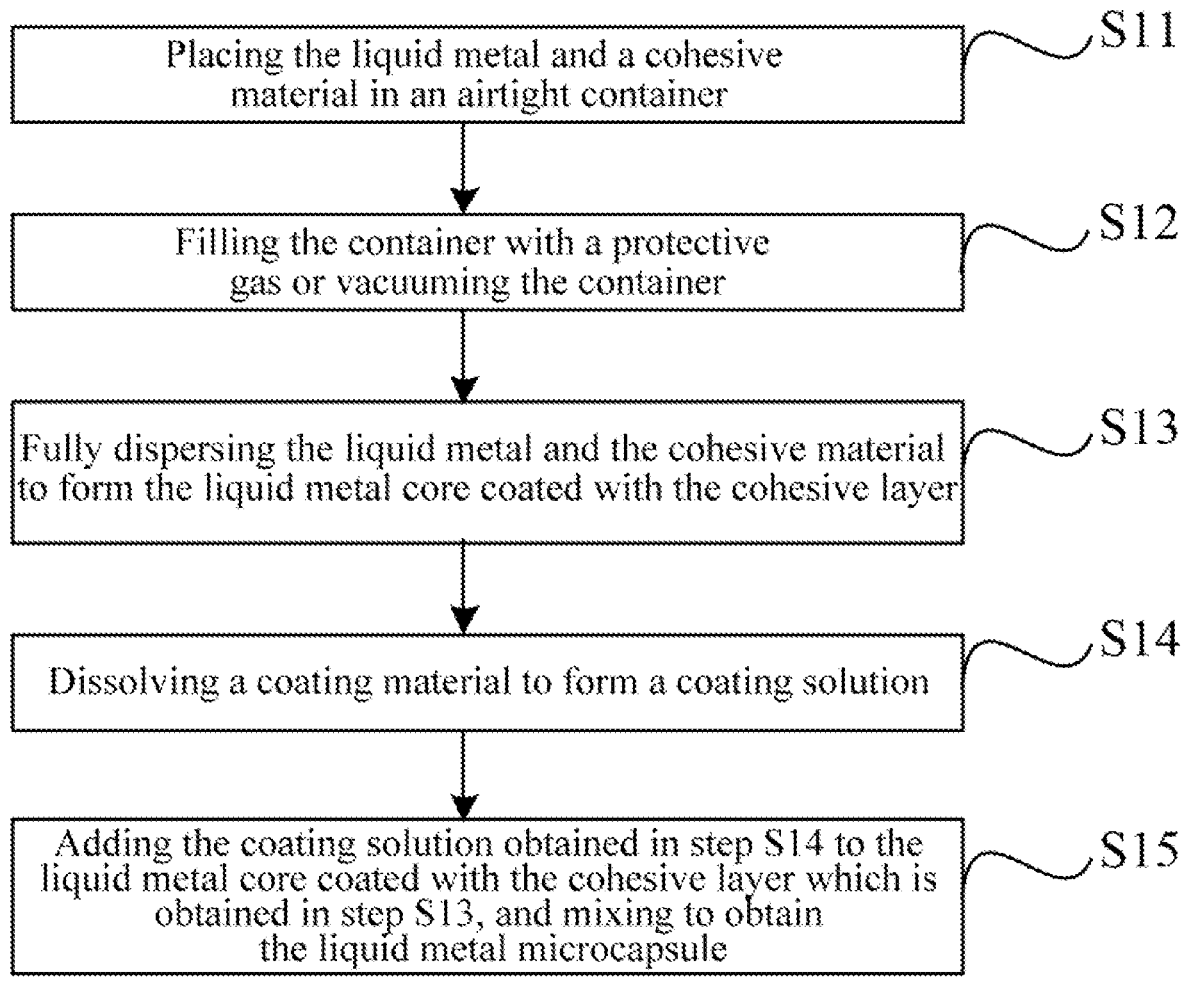
FIG. 3 is a flowchart of a liquid metal microcapsule preparation method according to an embodiment of the present application.

Correspondingly, according to an embodiment of the present application, a liquid metal microcapsule preparation method is further provided, for preparing the liquid metal microcapsule according to any one of the foregoing. Specifically, as shown in FIG. 3, FIG. 3 is a flowchart of a liquid metal microcapsule preparation method according to an embodiment of the present application. The liquid metal microcapsule preparation method includes the following steps.

In step S11, liquid metal and a cohesive material are placed in an airtight container.

Optionally, a mass ratio of the liquid metal to the cohesive material is in a range from 1:20 to 1:2, for example, 1:19, 1:18, 1:17, 1:16, 1:15, 1:14, 1:13, 1:12, 1:11, 1:10, 1:9, 1:8, 1:7, 1:6, 1:5, 1:4 or 1:3, and preferably 1:8 to 1:16, so that the cohesive material coats the liquid metal to form a cohesive layer with a suitable thickness and the conductive paste containing the liquid metal microcapsule has better stability and conductivity.

In step S12, the container is filled with a protective gas or vacuumed.

In step S13, the liquid metal and the cohesive material are fully dispersed to form a liquid metal core coated with a cohesive layer.

For example, by means of ultrasonic, ball milling or high-speed stirring, the liquid metal and the cohesive material are fully fanned to form a liquid metal core coated with a cohesive layer.

In step S14, a coating material is dissolved to form a coating solution.

Optionally, a mass ratio of the coating solution to the liquid metal is in a range from 1:10 to 1:2, for example, 1:9, 1:8, 1:7, 1:6, 1:5, 1:4 or 1:3, preferably 1:8 to 1:4, so that the formed coating layer has a moderate thickness and the conductive paste containing the liquid metal microcapsule has better stability and conductivity.

In step S15, the material obtained in step S14 is added to the material obtained in step S13, and the materials are mixed to obtain the liquid metal microcapsule, the liquid metal microcapsule including: a liquid metal core, a cohesive layer coating the liquid metal core, and a coating layer coating the cohesive layer.

In addition, according to an embodiment of the present application, a conductive paste is further provided. The conductive paste includes: conductive powder, a film-forming substance, a solvent, an auxiliary agent, and the liquid metal microcapsule according to any one of the foregoing.

The conductive powder may be one or a mixture of at least two of gold powder, silver powder, copper powder, iron powder, nickel powder, aluminum powder, graphene powder, carbon black powder, graphite powder, silver coated copper powder, and the like. The conductive powder is in a shape of one or a combination of at least two of a flake, a ball, a line, a rod, a needle, a branch, and the like. The conductive powder has a dimension ranging from 0.1 μm to 6 μm.

The film-forming substance may be one or more of polyurethane resin, polyester resin, chloro-vinegar resin, epoxy resin, and acrylic resin.

The auxiliary agent may include one or more of an antioxidant, a softening agent, a leveling agent, a defoaming agent, and a viscosity modifier.

The solvent may include one or more of butyl ketone, cyclohexanone, methyl isobutyl ketone, diisobutyl ketone, isophorone, methylbenzene, dimethylbenzene, butyl carbitol, alcohol ester 12, DBE, ethylene glycol monobutyl ether, ethylene glycol monoethyl ether, dipropylene glycol methyl ether, diethylene glycol monoethyl ether acetate, and ethylene glycol monobutyl ether acetate.

Optionally, in an embodiment of the present application, the conductive paste includes 45 wt % to 80 wt % of the conductive powder; 1 wt % to 10 wt % of the film-forming substance; 0.01 wt % to 50 wt % of the liquid metal microcapsule; 0.1 wt % to 2 wt % of the auxiliary agent; and 2 wt % to 20 wt % of the solvent.

For example, the conductive paste includes 45 wt %, 50 wt %, 55 wt %, 60 wt %, 65 wt %, 70 wt %, 75 wt % or 80 wt % conductive powder. The conductive paste includes 1 wt %, 2 wt %, 3 wt %, 4 wt %, 5 wt %, 6 wt %, 7 wt %, 8 wt %, 9 wt % or 10 wt % film-forming substance. The conductive paste includes 0.01 wt %, 0.1 wt %, 0.5 wt %, 1 wt %, 2 wt %, 5 wt %, 10 wt %, 15 wt %, 20 wt %, 25 wt %, 30 wt %, 35 wt %, 40 wt %, 45 wt % or 50 wt % liquid metal microcapsule. The conductive paste includes 0.1 wt %, 0.2 wt %, 0.5 wt %, 1 wt %, 1.5 wt % or 2 wt % auxiliary agent. The conductive paste includes 2 wt %, 3 wt %, 5 wt %, 10 wt %, 15 wt % or 20 wt % solvent.

The conductive paste in the embodiment of the present application may further include a crosslinking agent. The crosslinking agent may be 1 wt % to 15 wt %, such as 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt % or 15 wt %. The crosslinking agent can crosslink with the coating material and/or with the film-forming substance during the curing of the conducting circuit made of conductive paste to generate a three-dimensional net structure, thereby improving the flexibility of the conducting circuit.

Figure 4:
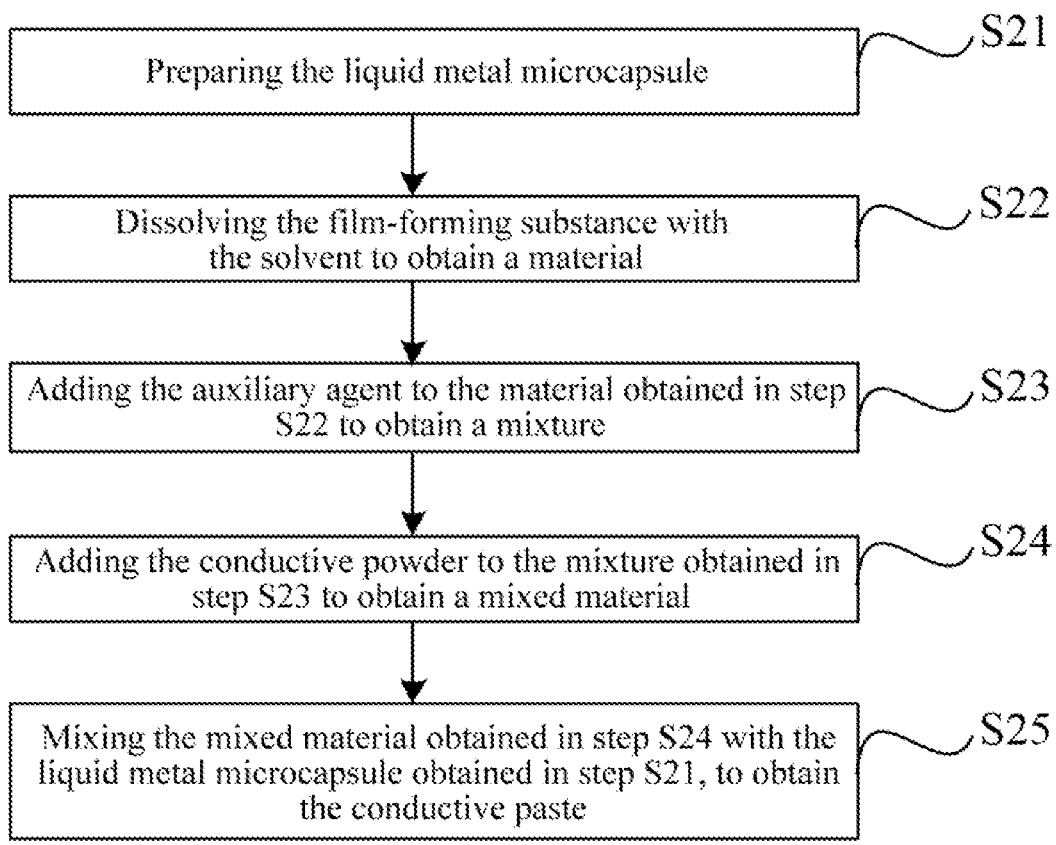
FIG. 4 is a flowchart of a conductive paste preparation method according to an embodiment of the present application.

Correspondingly, according to an embodiment of the present application, a conductive paste preparation method is further provided, for preparing the conductive paste according to any one of the foregoing. Specifically, as shown in FIG. 4, FIG. 4 is a flowchart of a conductive paste preparation method according to an embodiment of the present application. The conductive paste preparation method includes the following steps.

In step S21, the liquid metal microcapsule is prepared.

In step S22, the film-forming substance is dissolved by using the solvent.

In step S23, the auxiliary agent is added to the material obtained in step S22.

In step S24, the conductive powder is added to the material obtained in step S23.

In step S25, the material obtained in step S24 is mixed with the material obtained in step S21, to obtain the conductive paste.

The above descriptions of the conductive paste are applicable to the preparation method and are not repeated herein.

In addition, in an embodiment of the present application, an electronic device is further provided, including a substrate and a conducting circuit located on the substrate. The conducting circuit is formed by printing and curing of the conductive paste according to any one of the foregoing.

The electronic device may be a flexible sensor, a wearable device, a flexible electronic label, an FPC circuit board or other electronic devices in need of the use of a conducting circuit, especially electronic devices in need of a flexible conducting circuit. The above printing manner may be screen printing, flexographic printing, pad printing, extrusion dispensing, steel screen printing, or other forming processes.

The substrate may be one of polyethylene terephthalate (PET), polybutylene terephthalate (PBT), polyethylene naphthalate (PEN), polyimide (PI), and polyamide (PA) films.

In order to facilitate those skilled in the art to understand and implement the liquid metal microcapsule and the conductive paste in the embodiments of the present application, several specific embodiments and comparative examples are provided in the embodiments of the present application for property comparison.

Embodiment 1

| Liquid metal microcapsule | | |
| --- | --- | --- |
| Composition | Type | Dosage (g) |
| Liquid metal | Gallium-indium-tin eutectic alloy | 120 |
| Cohesive material | 50% high molecular weight block polymer solution with pigment affinity group (solvent: ethylene glycol monophenyl ether) | 8 |
| Coating solution | 30% epoxy resin solution (solvent: diethylene glycol monobutyl ether acetate) | 20 |

| Conductive paste preform | | |
| --- | --- | --- |
| Composition | Type | Dosage (g) |
| Film-forming substance solution | 30% epoxy resin solution (solvent: diethylene glycol monobutyl ether acetate) | 40 |
| Conductive powder | Ball silver powder | 150 |
| Crosslinking agent | Bayer 3175 | 10 |
| Softening agent | Polyether polyol | 8 |

| Conductive paste and property | | | |
| --- | --- | --- | --- |
| Number | Liquid metal microcapsule | Conductive paste preform | Sheet resistance of printed circuit |
| 1 | 5 g | 95 g | 0.0294 Ω/□ |
| 2 | 10 g | 90 g | 0.0306 Ω/□ |
| 3 | 20 g | 80 g | 0.0476 Ω/□ |
| 4 | 30 g | 70 g | 0.0581 Ω/□ |
| 5 | 50 g | 50 g | 0.25 Ω/□ |

Embodiment 2

| Liquid metal microcapsule | | |
| --- | --- | --- |
| Component | Type | Dosage (g) |
| Liquid metal | Gallium-indium-tin eutectic alloy | 60 |
| Cohesive material | BYK-P 104S | 8 |
| Coating solution | 30% polyester resin solution (solvent: diethylene glycol monobutyl ether acetate) | 10 |

| Conductive paste preform | | |
| --- | --- | --- |
| Composition | Type | Dosage (g) |
| Film-forming substance solution | 30% polyester resin solution (solvent: diethylene glycol monobutyl ether acetate) | 40 |
| Conductive powder | Ball silver powder | 160 |
| Crosslinking agent | Bayer 3175 | 8 |
| Softening agent | Polyether polyol | 8 |

| Conductive paste and property | | | |
| --- | --- | --- | --- |
| Number | Liquid metal composite material | Conductive paste | Sheet resistance of printed circuit |
| 6 | 5 g | 95 g | 0.027 Ω/□ |
| 7 | 10 g | 90 g | 0.029 Ω/□ |
| 8 | 20 g | 80 g | 0.043 Ω/□ |
| 9 | 30 g | 70 g | 0.052 Ω/□ |
| 10 | 50 g | 50 g | 0.23 Ω/□ |

Comparative Example 1

| Conductive paste preform | | |
| --- | --- | --- |
| Composition | Type | Dosage (g) |
| Film-forming substance solution | 30% epoxy resin solution (solvent: diethylene glycol monobutyl ether acetate) | 40 |
| Conductive powder | Ball silver powder | 150 |
| Crosslinking agent | Bayer 3175 | 10 |
| Softening agent | Polyether polyol | 8 |

Conductive Paste and Property 1 wt0 liquid metal by weight is added to the conductive paste preform, and after dispersion, the conductive paste becomes a black glue block, properties change, printing is impossible, and the obtained material is not conductive after drying.

Comparative Example 2

| Liquid metal microcapsule | | |
| --- | --- | --- |
| Composition | Type | Dosage (g) |
| Liquid metal | Gallium-indium-tin eutectic alloy | 60 |
| Coating solution | 30% polyester resin solution | 10 |

-continued

Liquid metal microcapsule

| Composition | Type | Dosage (g) |
|---|---|---|
| | (solvent: diethylene glycol monobutyl ether acetate) | |

Conductive paste preform

| Composition | Type | Dosage (g) |
|---|---|---|
| Film-forming substance solution | 30% polyester resin solution (solvent: diethylene glycol monobutyl ether acetate) | 40 |
| Conductive powder | Ball silver powder | 160 |
| Crosslinking agent | Bayer 3175 | 8 |
| Softening agent | Polyether polyol | 8 |

Conductive Paste and Property

A liquid metal microcapsule of 5 g is mixed with a conductive paste preform of 95 g, and after dispersion, the paste becomes a black glue block, properties change, printing is impossible, and the obtained material is not conductive after drying.

Finally, it should be noted that the above embodiments are merely intended to describe instead of limiting the technical solutions of the present application. Although the present application is described in detail with reference to the above embodiments, those of ordinary skill in the art should understand that they can still make modifications to the technical solutions described in the above embodiments, or make equivalent replacements to some or all of the technical features in the technical solutions. These modifications or replacements do not make the essence of corresponding technical solutions depart from the scope of the technical solutions of the embodiments of the present application.

What is claimed is:

1. A liquid metal microcapsule, comprising a liquid metal core, a cohesive layer coating the liquid metal core, and a coating layer coating the cohesive layer;
    wherein a binding force between the cohesive layer and liquid metal of the liquid metal core is greater than that between the coating layer and the liquid metal, and
    a binding force between the cohesive layer and the coating layer is greater than that between the coating layer and the liquid metal;
    wherein the cohesive layer has a thickness ranging from 5 nm to 30 nm, and the coating layer has a thickness ranging from 20 nm to 200 nm, and
    a mass ratio of the liquid metal to the cohesive material is ranging from 1:20 to 1:2.

2. The liquid metal microcapsule according to claim 1, wherein
    a substance for promoting dispersion of the liquid metal is selected as a cohesive material for forming the cohesive layer.

3. The liquid metal microcapsule according to claim 1, wherein
    the liquid metal microcapsule has a diameter ranging from 0.01 μm to 5 μm.

4. A method for preparing the liquid metal microcapsule according to claim 1, comprising:
    step S11, placing the liquid metal and a cohesive material in an airtight container;
    step S12, filling the container with a protective gas or vacuuming the container;
    step S13, fully dispersing the liquid metal and the cohesive material to form the liquid metal core coated with the cohesive layer;
    step S14, dissolving a coating material to form a coating solution; and
    step S15, adding the coating solution obtained in step S14 to the liquid metal core coated with the cohesive layer which is obtained in step S13, and mixing to obtain the liquid metal microcapsule,
    wherein the liquid metal microcapsule comprises: the liquid metal core, the cohesive layer coating the liquid metal core, and the coating layer coating the cohesive layer.

5. The method according to claim 4, wherein a mass ratio of the liquid metal to the cohesive material is within a range from 1:20 to 1:2.

6. The method according to claim 4, wherein a mass ratio of the coating solution to the liquid metal is within a range from 1:10 to 1:2.

7. A conductive paste, comprising: conductive powder, a film-forming substance, a solvent, an auxiliary agent, and the liquid metal microcapsule according to claim 1.

8. The conductive paste according to claim 7, wherein
    the conductive paste comprises 45 wt % to 80 wt % of the conductive powder; 1 wt % to 10 wt % of the film-forming substance; 0.01 wt % to 50 wt % of the liquid metal microcapsule; 0.1 wt % to 2 wt % of the auxiliary agent; and 2 wt % to 20 wt % of the solvent.

9. A method for preparing the conductive paste according to claim 7, comprising:
    step S21, preparing the liquid metal microcapsule;
    step S22, dissolving the film-forming substance with the solvent to obtain a material;
    step S23, adding the auxiliary agent to the material obtained in step S22 to obtain a mixture;
    step S24, adding the conductive powder to the mixture obtained in step S23 to obtain a mixed material; and
    step S25, mixing the mixed material obtained in step S24 with the liquid metal microcapsule obtained in step S21, to obtain the conductive paste.

10. An electronic device, comprising a substrate and a conducting circuit located on the substrate, wherein the conducting circuit is formed by printing and curing of the conductive paste according to claim 7.

* * * * *